US008634884B2

(12) United States Patent
Kim et al.

(10) Patent No.: US 8,634,884 B2
(45) Date of Patent: Jan. 21, 2014

(54) SLIDING-TYPE PORTABLE TERMINAL

(75) Inventors: Yong-Kyu Kim, Daegu (KR); Jae-Gab Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1218 days.

(21) Appl. No.: 12/044,476

(22) Filed: Mar. 7, 2008

(65) Prior Publication Data

US 2008/0234014 A1    Sep. 25, 2008

(30) Foreign Application Priority Data

Mar. 20, 2007  (KR) .................. 10-2007-0027094

(51) Int. Cl.
*H04M 1/00* (2006.01)
*H04M 9/00* (2006.01)

(52) U.S. Cl.
USPC ................................... 455/575.4; 379/433.12

(58) Field of Classification Search
USPC ............. 455/466, 67.7, 567, 414.1, 415, 458, 455/550.1; 379/364, 433.12
See application file for complete search history.

(56) References Cited

U.S. PATENT DOCUMENTS

| | | | |
|---|---|---|---|
| 7,564,967 B2* | 7/2009 | Pan ........................... | 379/433.12 |
| 7,778,663 B2* | 8/2010 | Bong Doo ................. | 455/556.1 |
| 7,853,301 B2* | 12/2010 | Kim et al. .................. | 455/575.4 |
| 7,894,866 B2* | 2/2011 | Oh .............................. | 455/575.4 |
| 8,155,719 B2* | 4/2012 | Park ........................... | 455/575.4 |
| 2005/0197173 A1* | 9/2005 | Wee et al. .................. | 455/575.4 |
| 2007/0010284 A1* | 1/2007 | Park ........................... | 455/550.1 |
| 2008/0076493 A1* | 3/2008 | Seo et al. .................... | 455/575.4 |

FOREIGN PATENT DOCUMENTS

| | | | |
|---|---|---|---|
| EP | 1631043 | * | 1/2006 |
| KR | 10-2006-0049059 A | | 5/2006 |

* cited by examiner

*Primary Examiner* — Andrew Wendell
(74) *Attorney, Agent, or Firm* — Jefferson IP Law, LLP

(57) ABSTRACT

A sliding-type portable terminal is provided. The portable terminal includes a first housing, a first guide member fixed to the first housing, a slide member coupled to the first guide member while facing the first guide member, the slide member being adapted to slide in a first direction under guidance of the first guide member, a second guide member fixed to the slide member, a second housing having a guide recess extending in a second direction so as to receive the second guide member, the second housing being coupled to the second guide member so as to slide in the second direction under guidance of the second guide member and an elastic member having a first end supported on the first guide member and a second end supported on the second housing so as to provide elastic force in such a direction that the first and second ends move away from each other. The sliding-type portable terminal is adapted for convenient use of not only mobile communication services, but also multimedia services.

20 Claims, 10 Drawing Sheets

SLIDING-TYPE PORTABLE TERMINAL

PRIORITY

This application claims the benefit under 35 U.S.C. §119 (a) of a Korean patent application filed with the Korean Intellectual Property Office on Mar. 20, 2007 and assigned Serial No. 2007-27094, the entire disclosure of which is hereby incorporated by reference.

BACKGROUND OF THE INVENTION

1. Field of the Invention

The present invention relates to a portable terminal. More particularly, the present invention relates to a sliding-type portable terminal having housings coupled to each other so that one of the housings slides relative to the other.

2. Description of the Related Art

Generally, portable terminals are classified into bar-type terminals, flip-type terminals and folder-type terminals according to their appearance.

The bar-type terminals have a data input unit, a data output unit, a transmitter and a receiver mounted on a single body housing. The bar-type terminals have a problem in that the data input unit, i.e. a keypad, is always exposed and therefore may be erroneously operated. In addition, the fact that certain a distance must be ensured between the transmitter and receiver adversely affects the bar type terminal's compactness.

The flip-type terminals have a body, a flip and a hinge module for connecting the body and the flip to each other. The body is provided with a data input unit, a data output unit, a transmitter and a receiver. Although the flip-type terminals are advantageous in that the flip covers the data input unit, i.e. a keypad, in a standby mode so as to avoid erroneous operation, the fact that a distance must be ensured between the transmitter and receiver adversely affects the flip type terminal's compactness, as in the case of the bar-type terminals.

The folder-type terminals have a body, a folder, and a hinge module for rotatably connecting the body and the folder to each other so that the folder is rotated to open/close the terminal. When the folder is folded onto the body (i.e. in a standby mode), erroneous operation of the keypad is avoided. When the folder is unfolded (i.e. in a communication mode), a sufficient distance is ensured between the transmitter and receiver. This structure is advantageous for compactness. Therefore, the folder-type terminals have become very popular in the portable terminal market.

The hinge module of the flip-type or folder-type terminals rotatably couples the flip or folder to the body so that, when the flip or folder rotates more than a predetermined angle, it is provided with force in such a direction that it is automatically unfolded without additional force. When the flip or folder rotates less than the predetermined angle, it is provided with force in such a direction that it is folded onto the body.

As portable terminals are becoming more widely used, customers are tending to demand more diversified functions and designs of the portable terminals. In order to satisfy such demand, sliding-type, swing-type, and pop-up-type terminals have appeared. Particularly, the sliding-type terminals are overtaking the folder-type terminals regarding popularity in the portable terminal market.

Users are also tending to demand that multimedia functions be provided with their portable terminals. However, although portable terminals are becoming multimedia devices in line with the diversity of mobile communication services, portable terminals have not yet departed from conventional folder-type and sliding-type terminals. This means that current portable terminals are still inconvenient to use as far as multimedia services are concerned. Although some terminals have been developed to use multimedia services conveniently, their structural stability has not yet been secured, which means that their commercialization still has many problems.

SUMMARY OF THE INVENTION

An aspect of the present invention is to address the above-mentioned problems and/or disadvantages occurring in the prior art and to provide at least the advantages described below. Accordingly, it is an aspect of the present invention to provide a sliding-type portable terminal adapted for convenient use of not only mobile communication services, but also multimedia services.

It is another aspect of the present invention to provide a sliding-type portable terminal which is opened and closed so as to ensure convenient use of mobile communication and multimedia services, and which has structural stability sufficient for commercialization.

In accordance with an aspect of the present invention, a portable terminal is provided. The portable terminal includes a first housing, a first guide member fixed to the first housing, a slide member coupled to the first guide member while facing the first guide member, the slide member being adapted to slide in a first direction under guidance of the first guide member, a second guide member fixed to the slide member, a second housing having a guide recess extending in a second direction so as to receive the second guide member, the second housing being coupled to the second guide member so as to slide in the second direction under guidance of the second guide member and an elastic member having a first end supported on the first guide member and a second end supported on the second housing so as to provide elastic force in such a direction that the first and second ends move away from each other, wherein the second housing is provided with elastic force by the elastic member when overlapping the first housing so that the second housing selectively slides in the first direction together with the slide member and the second guide member or in the second direction relative to the second guide member.

In accordance with another aspect of the present invention, a portable terminal having a pair of housings coupled so as to slide while facing each other is provided. One of the housings can slide in either of first and second directions, which are perpendicular to each other, while facing the other away from a position in which it folds onto the other.

In accordance with yet another aspect of the present invention, a first guide member is provided and is fixed to the first housing. A slide member is provided and is coupled as to slide while facing the first guide member, and a second guide member is provided and is fixed to the slide member. The first guide member, slide member and second guide member couple the housings of the terminal so as to slide relative to each other. Elastic members, supported on the first guide member and the second housing, provide elastic force necessary to move the second housing.

BRIEF DESCRIPTION OF THE DRAWINGS

The above and other exemplary features, aspects, and advantages of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
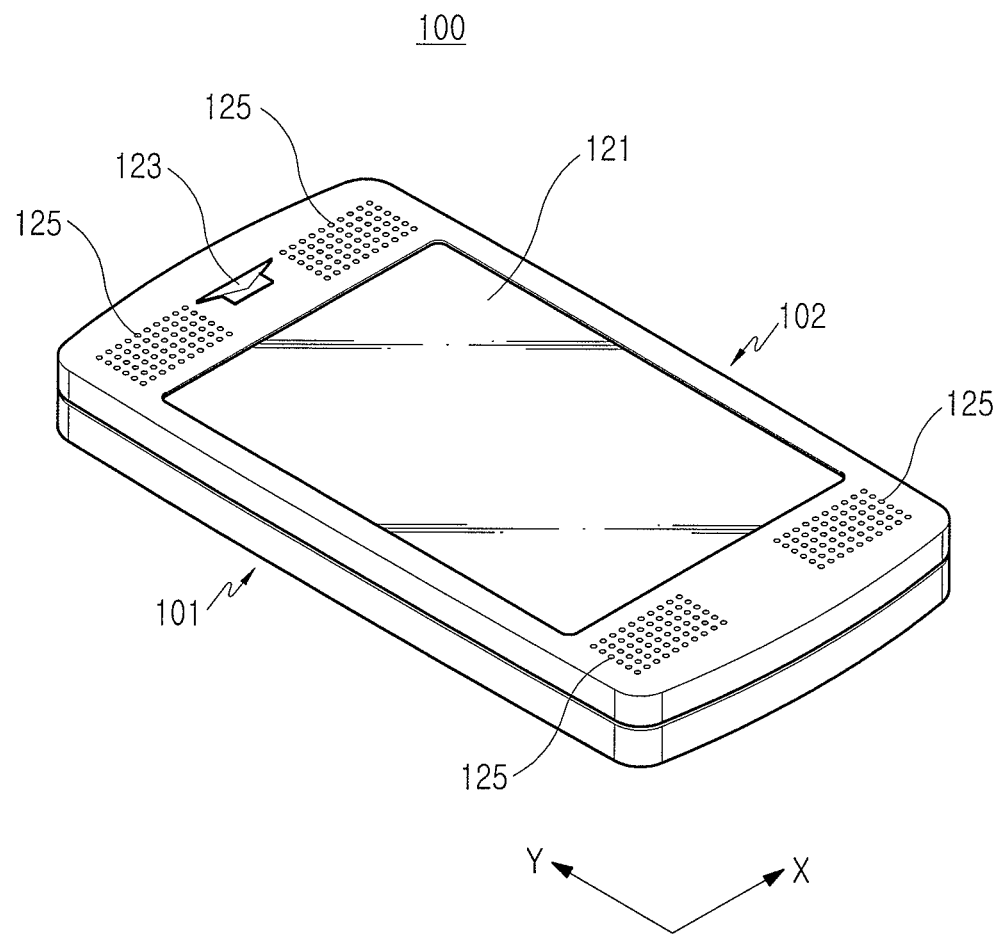
FIG. 1 is a perspective view illustrating a sliding-type portable terminal according to an exemplary embodiment of a present invention.
Figure 2:
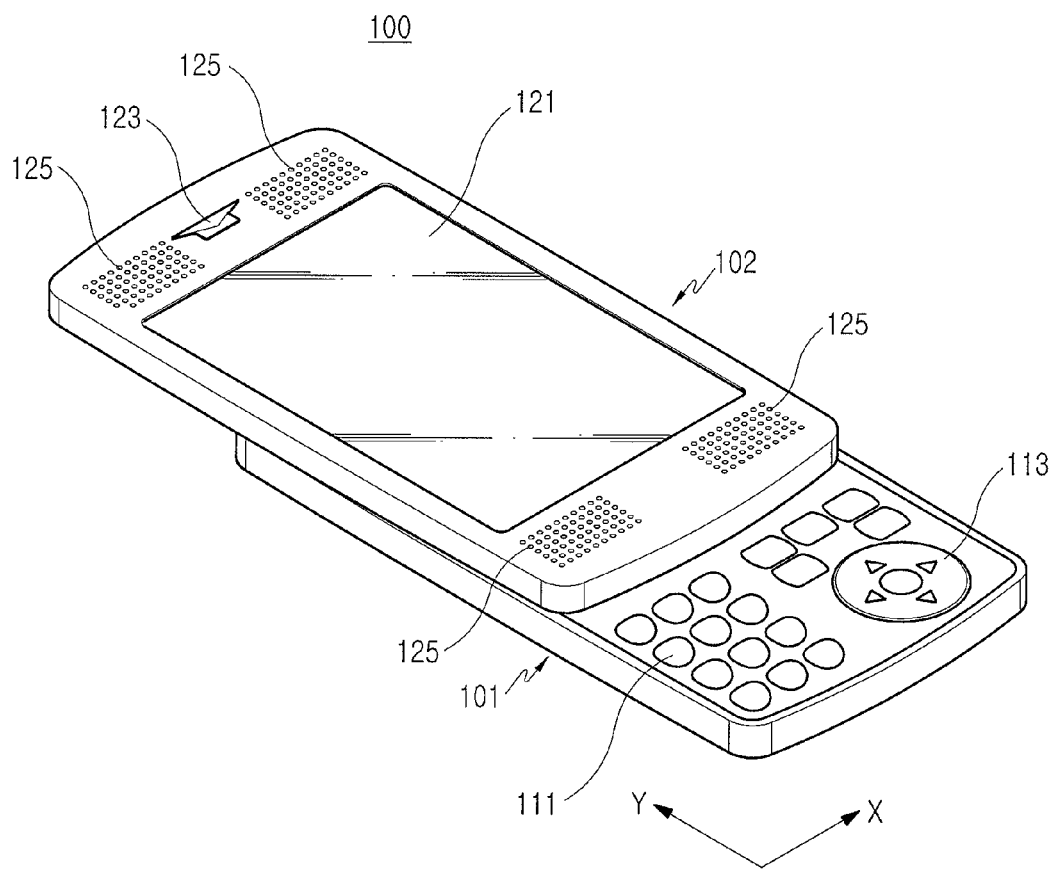
FIG. 2 is a perspective view illustrating a second housing of the portable terminal shown in FIG. 1 when the second housing has moved in a first direction.
Figure 3:
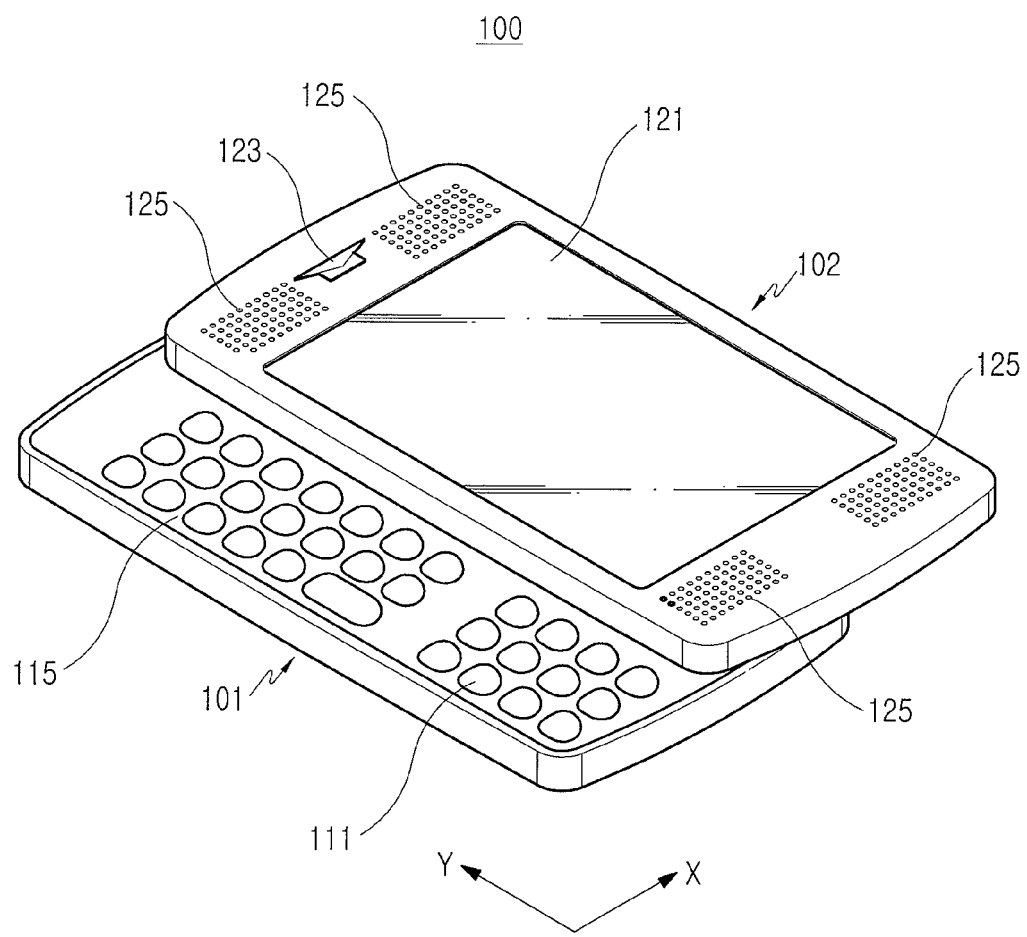
FIG. 3 is a perspective view illustrating a second housing of the portable terminal shown in FIG. 1 when the second housing has slid in a second direction.

Referring to FIGS. 1 to 3, a portable terminal 100 according to an exemplary embodiment of the present invention includes a first housing 101 and a second housing 102 coupled to the first housing 101 so as to slide in a first direction Y or in a second direction X while facing the first housing 101. When the second housing 102 moves in the first direction Y or the second direction X away from a first position in which the second housing 102 overlaps the first housing 101, the first housing 101 is partially exposed. Particularly, when the second housing 102 moves in the first direction Y, the lower side of a surface of the first housing 101 is exposed and, when the second housing 102 moves in the second direction X, one side of the surface of the first housing 101 is exposed.

As used herein, the first direction Y refers to the longitudinal direction of the first housing 101, and the second direction X refers to the transverse direction thereof. Thus, the first direction Y and the second direction X are perpendicular to each other.

The first housing 101 includes a first keypad 111, a functional keypad 113, and a second keypad 115 positioned on a surface thereof. Although not shown in the drawings, the first housing 101 may be provided with a receiver, similar to receiver 123 positioned on the second housing 102, which contains a microphone device, in order to provide a voice communication function.

The first keypad 111 is used to input numerals and characters when conducting voice communication or writing short messages. The functional keypad 113 may consist of hot keys, including a navigation key, so that the user can instantly execute a specific function without going through complicated menus of the terminal 100 for calling/selecting different menus, starting/ending a call, etc. The second keypad 115 is used to write long mails or documents, and is combined with the first keypad 111 so as to construct a keypad having a QWERTY-type arrangement.

The second housing 102 includes a display device 121 and a receiver 123 positioned on a surface thereof. The second housing 102 may also have speaker devices 125 mounted on its upper and lower portions so as to be suitable for multimedia services.

Referring to FIG. 2, the second housing 102 has moved in the first direction Y from the first position, in which the second housing 102 overlaps the first housing 101, to a second position in which the second housing 102 exposes the first keypad 111 and the functional keypad 113. As such, movement of the second housing 102 to the second position exposes the lower portion of a surface of the first housing 101, particularly the first keypad 111 and the functional keypad 113.

In this condition, the user can use the first keypad 111 to input/call a counterpart's telephone number or write short messages. The user can also set up the environment or functions of the terminal 100 and call/execute various menus by using the functional keypad 113.

Referring to FIG. 3, the second housing 102 has moved in the second direction X from the first position, in which the second housing 102 overlaps the first housing 101, to a third position in which the second housing 102 exposes the first and second keypads 111 and 115. As such, movement of the second housing 102 to the third position exposes one side of a surface of the first housing 102, particularly the first and second keypads 111 and 115.

The user is then able to conveniently write long mails or documents by using a keypad of a QWERTY-type arrangement, which is obtained by combining the first and second keypads 111 and 115.

When the second housing 102 is in the third position, users can position the terminal 100 in the transverse direction and operate the first and second keypads 111 and 115 with both hands. The user can also watch moving pictures or broadcasts in that position. In other words, the display device 121 provides such a transversely long screen that the user can use multimedia services conveniently. Furthermore, the speaker devices 125, on both sides of the display device 121, output sounds when playing moving pictures or watching broadcasts. This provides stereo or three-dimensional stereophonic sounds and enhances the multimedia effect.

Figure 4:
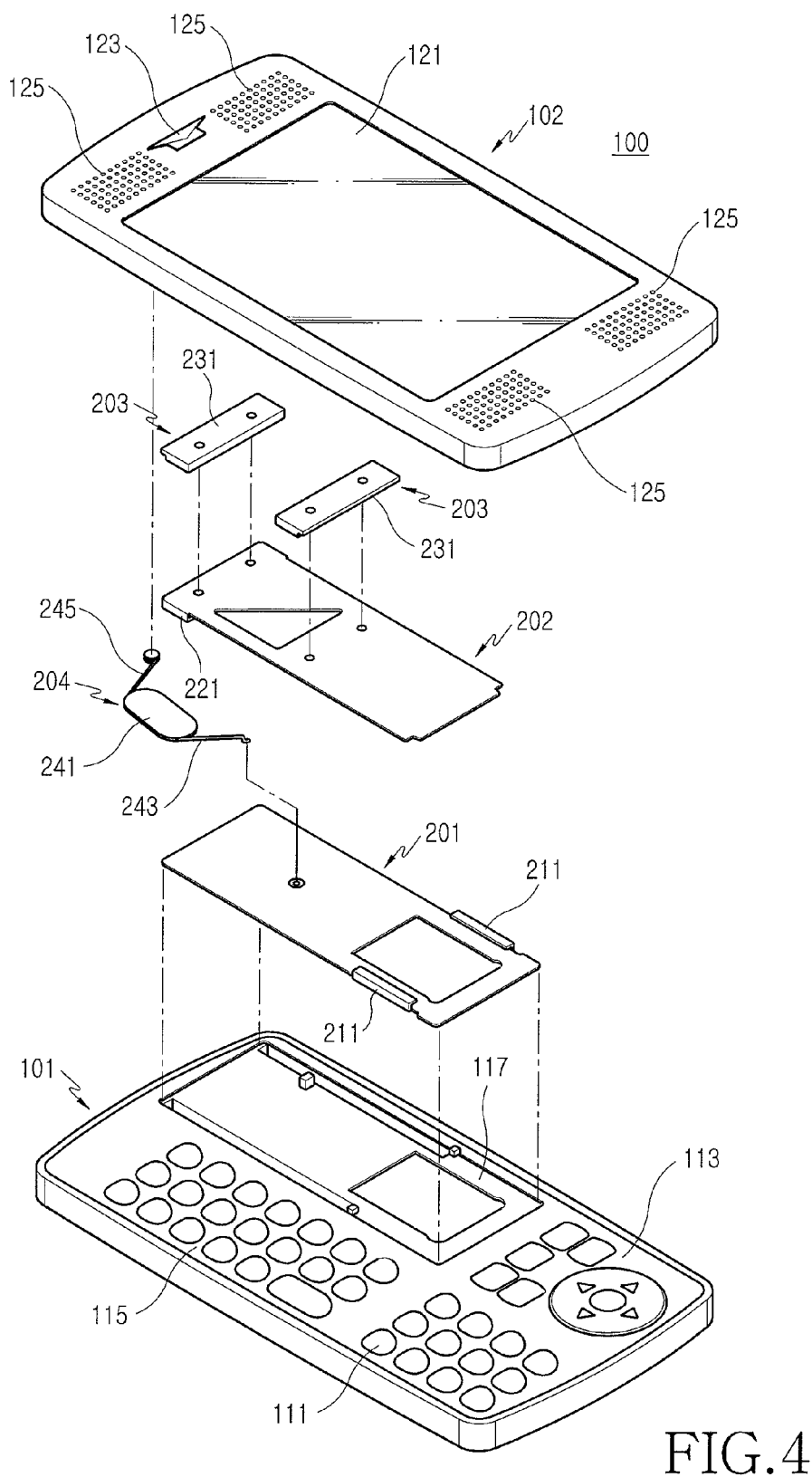
FIG. 4 is an exploded perspective view illustrating the portable terminal shown in FIG. 1.
Figure 5:
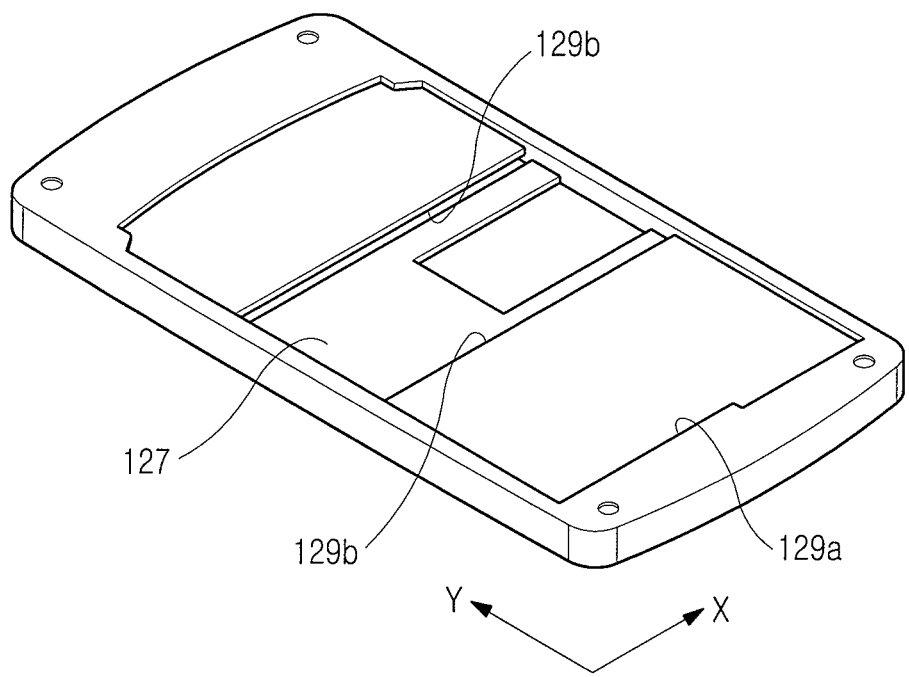
FIG. 5 is a perspective view illustrating the back of the second housing of the portable terminal shown in FIG. 1.

Referring to FIGS. 4 and 5, the first housing 101 is coupled to the second housing 102 by means of a first guide member 201, a slide member 202, and second guide members 203. In addition, the terminal 100 has an elastic member 204 in order to provide driving force necessary to move the second housing 102.

The first guide member 201 is fixed to the first housing 101, and guides the second housing 102 so as to slide in the first direction Y. In order to mount the first guide member 201, the first housing 101 has a mounting recess 117 formed on a surface thereof. The mounting recess 117 remains covered regardless of whether or not the second housing 102 slides. The first guide member 201 may be made of a metallic material in order to secure rigidity and durability, and is fixed to the mounting recess 117 by a fastening means (e.g. screw).

Although not shown in the drawings, in order to determine the mounting position of the first guide member 201, protrusions may be formed on the mounting recess 117, and corresponding holes may be formed in the first guide member 201. After determining the mounting position of the first guide member 201 by causing the protrusions and the holes to engage with each other, and fastening them by screws, for example, the first guide member 201 can be assembled easily.

The first guide member 201 has first guide ribs 211 formed on portions of both lateral ends, respectively. The first guide member 201 and the slide member 202 have the shape of plates extending in the first direction Y. The slide member 202 slides in the first direction Y under the guidance of the first guide member 201. The first guide ribs 211 are coupled so as to at least partially surround both lateral ends of the slide member 202, and guide the sliding movement of the slide member 202.

In an exemplary embodiment, the slide member 202 is made of a metallic material in order to secure structural stability. If both the first guide member 201 and the slide member 202 are made of a metallic material, the resulting friction could cause noise, which may severely irritate the user. Therefore, it is preferred to coat portions of the first guide member 201 and the slide member 202, which undergo direct friction, with a lubricant material.

The portions of the first guide member 201 and the slide member 202 that undergo direction friction, particularly the inner surfaces of the first guide ribs 211 may be coated with POM (polyoxymethylene), which is a synthetic resin having excellent mechanical properties (e.g. lubricating properties, resistance to wear and the like). Use of such POM reduces noise resulting from friction between the first guide member 201, particularly the first guide ribs 211 and the slide member 202, and ensures smooth sliding movement of the slide member 202.

The slide member 202 has second guide ribs 221 formed on portions of both lateral ends, respectively. The second guide ribs 221 are coupled so as to at least partially surround both lateral ends of the first guide member 201 so that, when the slide member 202 slides, it moves while surrounding both lateral ends of the first guide member 201.

As such, the first guide ribs 211 are coupled so as to surround other portions of the slide member 202, on which the second guide ribs 221 are not formed, and the second guide ribs 221 are coupled so as to surround other portions of the first guide member 201, on which the first guide ribs 211 are not formed. Therefore, the slide member 202 can slide under the guidance of the first and second guide ribs 211 and 221.

The inner surfaces of the second guide ribs 221 may also be coated with POM so as to reduce friction between the second guide ribs 221 and the first guide member 201, and to suppress noise.

The second guide members 203 are mounted and fixed so as to protrude from the slide member 202, and guide the second housing 102 so as to slide in the second direction X. In an exemplary embodiment, a pair of second guide members 203 are mounted on the upper and central portions of the slide member 202, respectively, and have third guide ribs 231 extending to the outside.

Although a pair of second guide members 203 are mounted on the slide member 202 according to an exemplary embodiment of the present invention, it is also possible to fabricate the second guide members 203 as an integral unit and form the third guide ribs 231 on their upper and lower ends, respectively, so that the sliding movement of the second housing 102 is guided.

In order to receive the second guide members 203, which have been fixed to protrude from the slide member 202, the second housing 102 has a guide recess 127 formed thereon. The guide recess 127 extends in the second direction X and receives the second guide members 203. When the second housing 102 moves in the second direction X, the second guide members 203 move inside the guide recess 127.

Referring to FIG. 5, in order to guide the sliding movement of the second housing 102 in the second direction X, the second housing 102 has a first guide slit 129*a* and second guide slits 129*b* formed on its rear surface. The first guide slit 129*a* is formed on the lower side of the rear surface of the second housing 102 while extending in the second direction X. The first guide slit 129*a* engages with an end of the slide member 202. When the second housing 102 moves in the second direction X, the end of the slide member 202 moves inside the first guide slit 129*a*.

The second guide slits 129*b* are formed on the upper and lower sides of the guide recess 127, respectively, while extending in the second direction X. The second guide slits 129*b* engage with the third guide ribs 231 so as to fasten the second guide members 203 to the second housing 102. In addition, the second guide slits 129*b* guide the sliding movement of the second housing 102 in the second direction X.

The elastic member 204 has a first and a second end supported on the first guide member 201 and the second housing 102, respectively, so as to provide elastic force in such a direction that both ends move away from each other. Such elastic force from the elastic member 204 acts as driving force for moving the second housing 102.

The elastic member 204 shown in FIG. 4 includes free ends 243 and 245 extending from a spring housing 241. The spring housing 241 receives a pair of coils (not shown) side by side, and the free ends 243 and 245 extend from respective coils. When mounted on the terminal 100, the elastic member 204 provides elastic force in such a direction that the free ends 243 and 245 move away from each other. The first and second free ends 243 and 245 are supported on the first guide member 201 and the second housing 102, respectively.

FIGS. 6 to 10 illustrate the back of the terminal 100, from which the first housing 101 is removed, in order to illustrate the sliding movement of the second housing 102.

Figure 6:
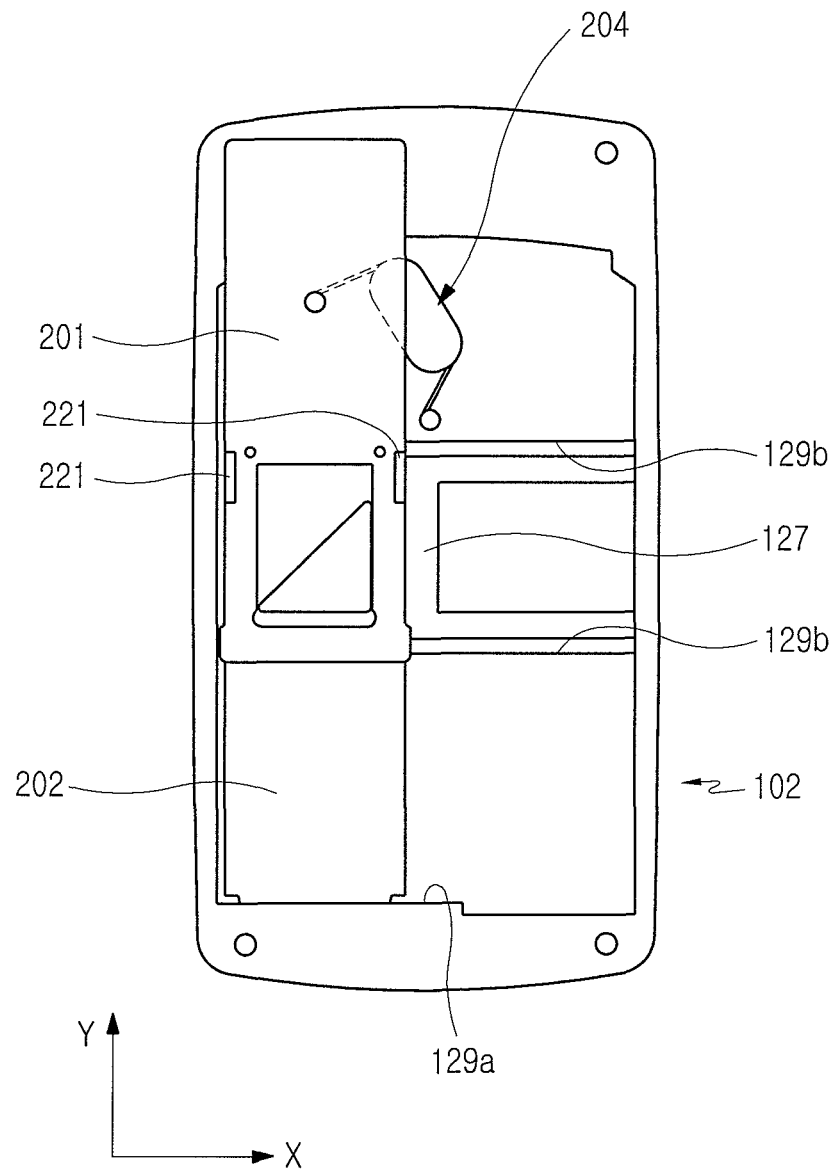
FIG. 6 illustrates the first housing of the portable terminal shown in FIG. 1 when the first housing is covered.

Referring to FIG. 6, the second housing 102 is in the first position, i.e. it overlaps first housing 101, as in the case of FIG. 1. In the first position, a surface of the first housing 101 is completely covered. The first guide member 201 and the slide member 202 are positioned on the upper and lower sides of the second housing 102, respectively.

When the second housing 102 is in the first position, the first guide ribs 211 and the second guide ribs 221 interfere with each other and prevent the second housing 102 from moving downwards. At the same time, elastic force from the elastic member 204 tends to move the second housing 102 downwards. In addition, as shown in FIG. 6, the second guide members 203 interfere with an end of the guide recess 127, and the elastic member 204 provides elastic force in such a direction that the second housing 102 moves rightward. As such, the second housing 102 stably remains still while completely covering a surface of the first housing 102.

Figure 7:
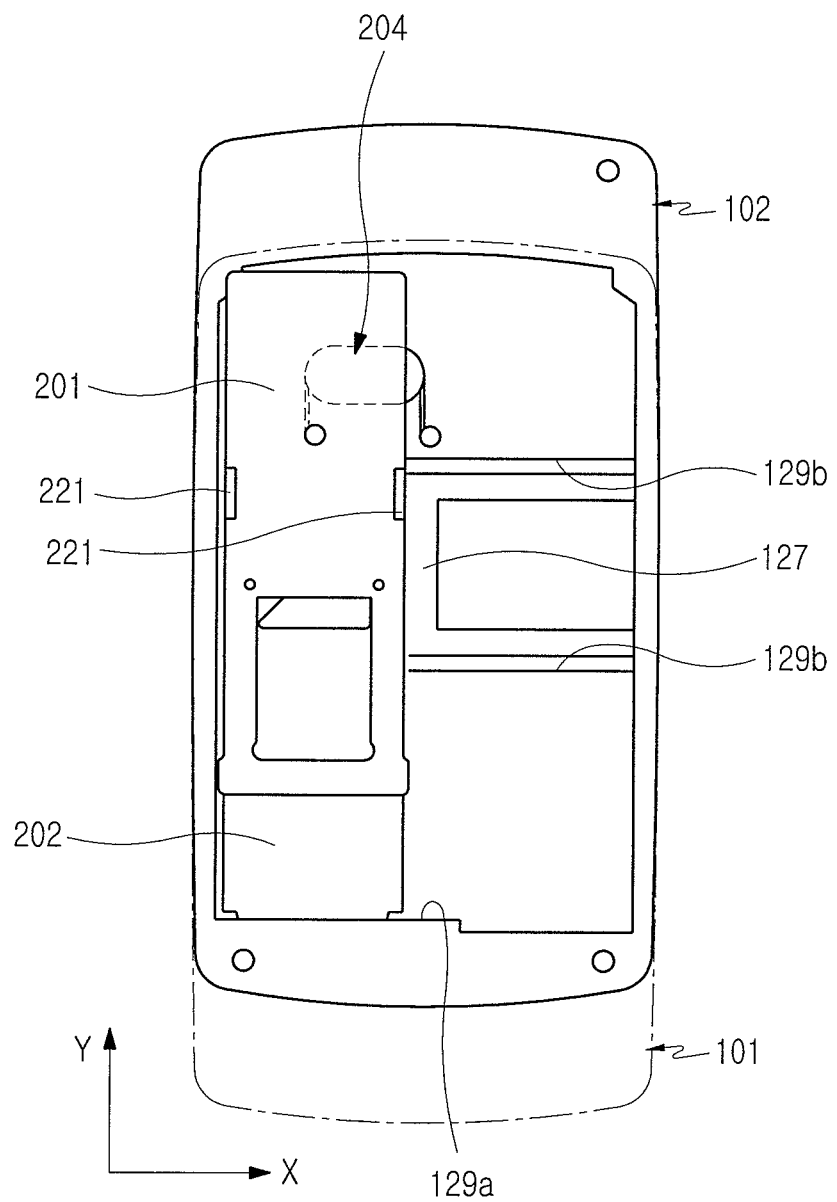
FIG. 7 illustrates a movement of the second housing of the portable terminal shown in FIG. 1 in the first direction.

Referring to FIG. 7, the second housing 102 moves in the first direction Y towards the upper side of the first housing 101. When the user moves the second housing 102 in the first direction Y towards the upper side of the first housing 101, the free ends 243 and 245 get closer to each other. The elastic member 204 then accumulates elastic force, which tends to move the second housing 102 downwards. The elastic force accumulated in the elastic member 204 reaches the maximum level when the first and second free ends 243 and 245 are closest to each other. If the first and second free ends 243 and 245 move away from each other, the elastic force is converted into driving force acting in such a direction that the second housing 102 moves upwards. Therefore, the elastic force from the elastic member 204 automatically moves the second housing 102 to the second position even if the user no longer moves the second housing 102 upwards.

In other words, when the second housing 102 is in a portion of the range of movement in the first direction Y, the elastic force from the elastic member 204 drives the second housing 102 downwards and, in the remaining portion, drives the second housing 102 upwards.

Figure 8:
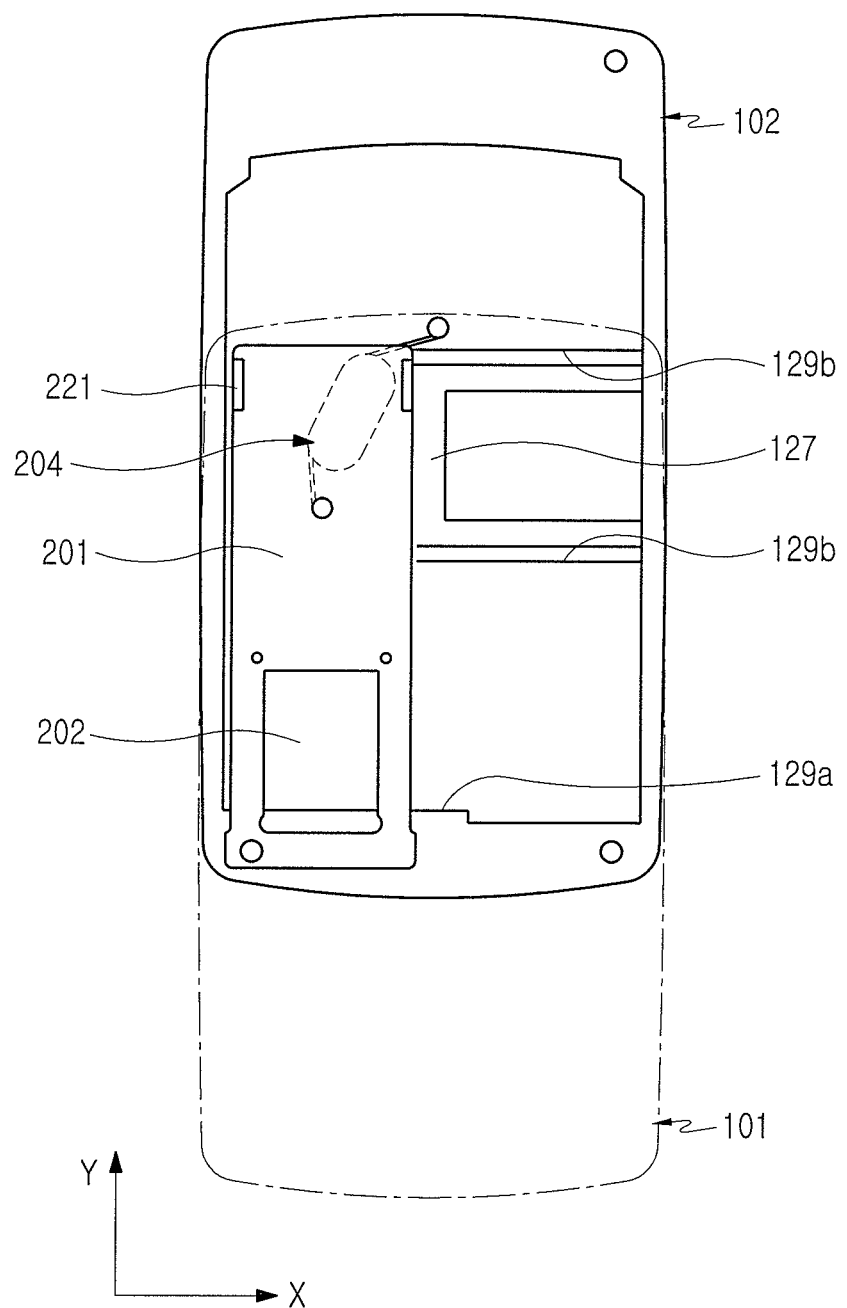
FIG. 8 illustrates the first housing of the portable terminal shown in FIG. 2 when the first housing is exposed.

Referring to FIG. 8, the second housing 102 is in the second position, i.e. it exposes the lower side of a surface of the first housing 101, as in the case of FIG. 2. In the second position, the second housing 102 exposes the first keypad 111 and the functional keypad 113, but the slide member 202 is hidden by the first guide member 201.

Even when the second housing 102 is in the second position, the elastic member 204 still provides elastic force in such a direction that the second housing 102 moves upwards. Portions of the first guide ribs 211 engage with the first guide slit 129a and stop the second housing 102 from moving upwards. Therefore, even in the second position, the second housing 102 stably remains still.

As a result, the range of movement of the second housing 102 in the first direction Y is limited by the first guide ribs 211, the second guide ribs 221, and the first guide slit 129a. The elastic member 204 provides not only driving force, but also force necessary to maintain the second housing 102 still.

Meanwhile, while the second housing 102 moves in the second position away from the first position, a portion of elastic force from the elastic member 204 causes the second guide members 203 to remain folded on an end of the guide recess 127. This prevents the second housing 102 from playing in the second direction X while moving in the first direction Y.

It is to be noted that, although the first and second free ends 243 and 245 are said to be closest to each other in a position when the second housing 102 moves in the first direction Y, descriptions regarding that position are limited to the movement of the second housing 102 in the first direction Y.

Figure 9:
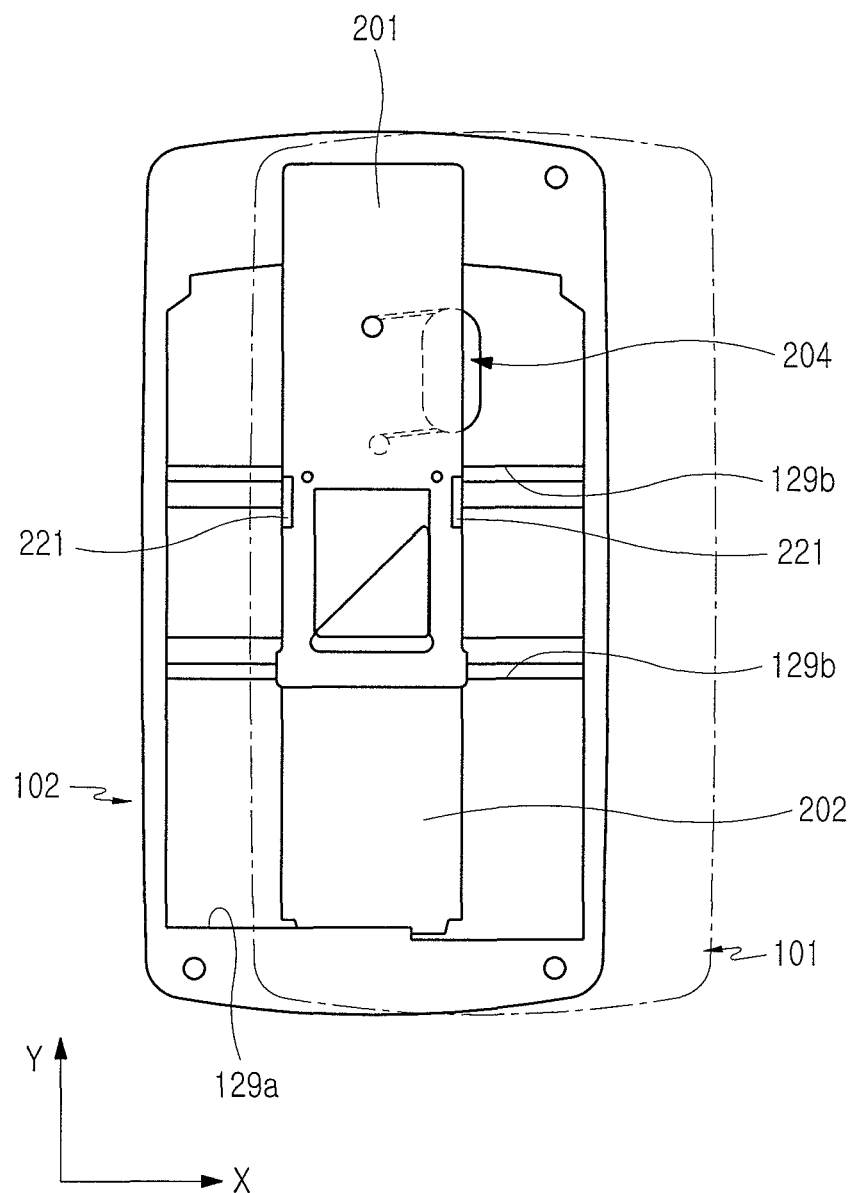
FIG. 9 illustrates a movement of the second housing of the portable terminal shown in FIG. 1 in the second direction.

Referring to FIG. 9, the second housing 102 moves in the second direction X to the left of the first housing 101. When the user moves the second housing 102 in the second direction X to the left of the first housing 101, the free ends 243 and 245 get closer to each other. The elastic member 204 then accumulates elastic force, which tends to move the second housing 102 rightward. The elastic force accumulated in the elastic member 204 reaches the maximum level when the first and second free ends 243 and 245 are closest to each other. If the first and second free ends 243 and 245 move away from each other, the elastic force is converted into driving force acting in such a direction that the second housing 102 moves leftward. Therefore, the elastic force from the elastic member 204 automatically moves the second housing 102 to the third position even if the user no longer moves the second housing 102 leftward.

In other words, when the second housing 102 is in a portion of the range of movement in the second direction X, the elastic force from the elastic member 204 drives the second housing 102 rightward and, in the remaining portion, drives the second housing 102 leftward.

Figure 10:
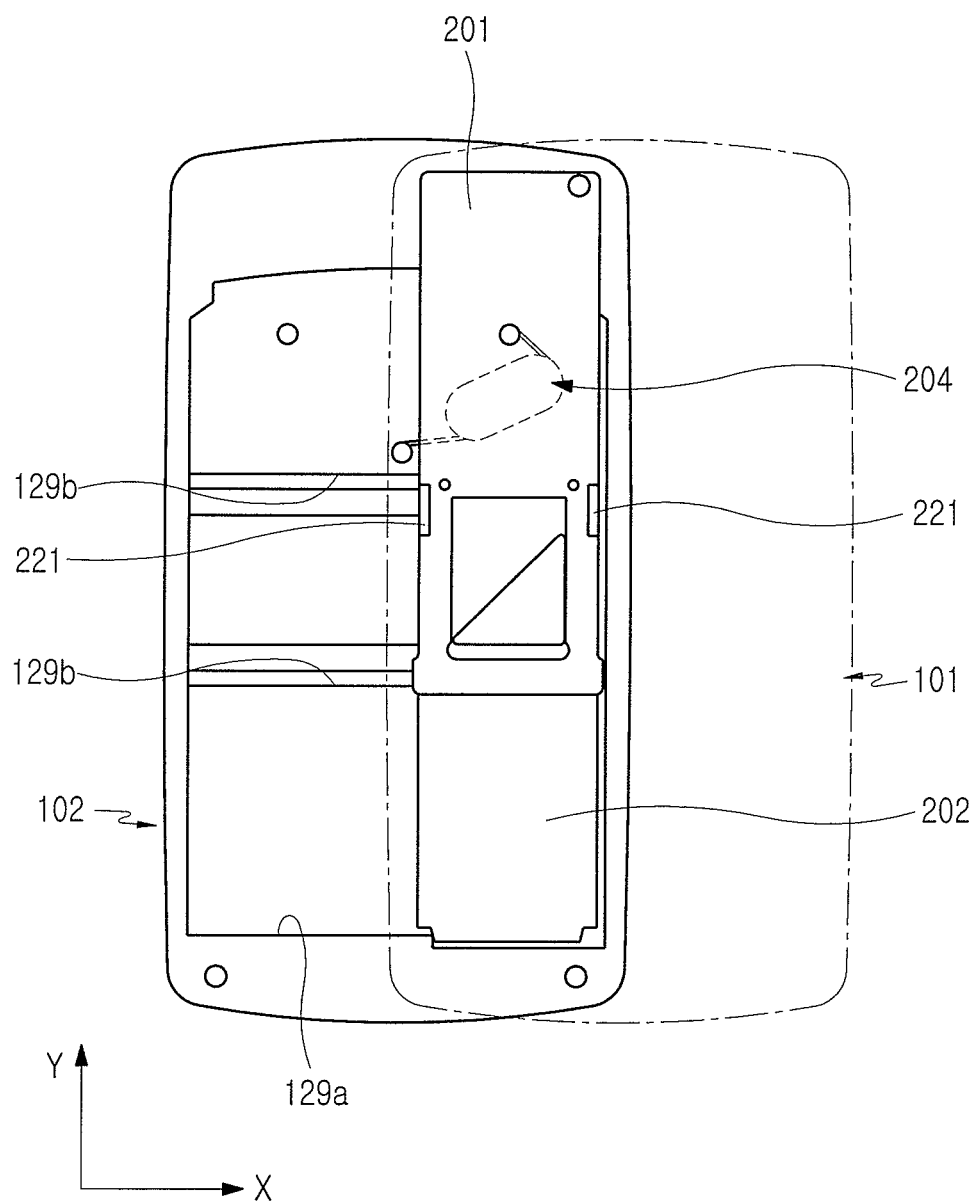
FIG. 10 illustrates the first housing of the portable terminal shown in FIG. 3 when the first housing is exposed.

Referring to FIG. 10, the second housing 102 is in the third position, i.e. it exposes one side of a surface of the first housing 101, as in the case of FIG. 3. In the third position, the second housing 102 exposes the first keypad 111 and the second keypad 115.

It is clear from FIG. 10 that, even when the second housing 102 is in the third position, the elastic member 204 still provides elastic force in such a direction that the second housing 102 move leftward. The second guide members 203 interfere with the other end of the guide recess 127 and stop the second housing 102 from moving leftward. Therefore, even in the third position, the second housing 102 stably remains still.

When the second housing 102 moves from the first to the third position, a portion of elastic force from the elastic member 204 causes the first and second guide ribs 211 and 221 to continuously interfere with each other. This limits the downward movement of the second housing 102 and, therefore, prevents the second housing 102 from playing in the first direction Y while moving from the first to the third position.

It is to be noted that, although the first and second free ends 243 and 245 are said to be closest to each other in a position when the second housing 102 moves in the second direction X, descriptions regarding that position are limited to the movement of the second housing 102 in the second direction X.

In addition, although upward, downward, leftward, and rightward directions have been defined in connection with descriptions of sliding movement of the second housing 102 with reference to FIGS. 6 to 10, the definition is for the purpose of convenience and brevity only. Those skilled in the art can easily define the direction of movement of the second housing 102 based on manufacturing requirements.

As described above, the portable terminal according to an exemplary embodiment of the present invention has a second housing adapted to slide in first and second directions, which are perpendicular to each other, so that the terminal can be used conveniently not only for conventional mobile communication services, but also for multimedia services. The fact that the housings of the terminal are slid to open/close the terminal in two directions guarantees convenient use. In addition, use of a single elastic member to couple the housings of the terminal and provide driving force in such a manner that the second housing can move in either of the first and second direction, which are perpendicular to each other, simplifies the structure of the terminal and improves its structural stability.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
    a first housing;
    a first guide member fixed to the first housing;
    a slide member coupled to the first guide member while facing the first guide member, the slide member being adapted to slide in a first direction under guidance of the first guide member;
    a second guide member fixed to the slide member;
    a second housing comprising a guide recess extending in a second direction perpendicular to the first direction so as to receive the second guide member, the second housing being coupled to the second guide member so as to slide in the second direction under guidance of the second guide member; and a single elastic member having two supported ends, one of which is supported on the first guide member fixed to the first housing and the other end is supported on the second housing so as to provide elastic force in such a direction that the one end of the elastic member moves away from the other end of the elastic member, wherein the second housing, when overlapping the first housing, is capable of sliding in the first direction together with the slide member and the second guide member while the second housing is provided with elastic force by the single elastic member or in the second direction relative to the second guide member while the second housing is provided with elastic force by the single elastic member.

2. The portable terminal as claimed in claim 1, wherein the first direction and the second direction are perpendicular to each other.

3. The portable terminal as claimed in claim 1, further comprising:
first guide ribs formed on first portions of both lateral ends of the first guide member, respectively; and
second guide ribs formed on first portions of both lateral ends of the slide member, respectively, wherein
the first guide ribs are coupled so as to surround second portions of both lateral ends of the slide member, respectively, and the second guide ribs are coupled so as to surround second portions of both lateral ends of the first guide member, respectively, so that sliding movement of the slide member is supported.

4. The portable terminal as claimed in claim 3, further comprising a first guide slit formed on the second housing, wherein, when the second housing covers the first housing, the first and second guide ribs interfere with each other and, when the second housing moves in the first direction and exposes a portion of the first housing, portions of the second guide ribs engage with the first guide slit so as to limit a range of movement of the second housing in the first direction.

5. The portable terminal as claimed in claim 4, wherein, when the second housing slides in the second direction, an end of the slide member moves inside the first guide slit.

6. The portable terminal as claimed in claim 1, further comprising:
a third guide rib formed on the second guide member; and
a second guide slit formed on the second housing in the second direction, wherein
the second housing is guided by the third guide rib and the second guide slit so as to slide in the second direction.

7. The portable terminal as claimed in claim 6, wherein the second guide slit is formed on each of upper and lower edges of the guide recess, and a pair of second guide members are mounted on the slide member.

8. The portable terminal as claimed in claim 1, wherein the second guide member interferes with both ends of the guide recess so as to limit a range of movement of the second housing in the second direction.

9. The portable terminal as claimed in claim 1, further comprising:
a first keypad placed on a lower side of a surface of the first housing;
a functional keypad placed on the lower side of the surface of the first housing while being adjacent to the first keypad; and
a second keypad placed on a side of a surface of the first housing while being adjacent to the first keypad, wherein
the second housing is adapted to slide in the first direction so as to expose/cover the first keypad and the functional keypad, and the second housing is adapted to slide in the second direction so as to expose/cover first and second keypads.

10. The portable terminal as claimed in claim 9, wherein the functional keypad comprises a navigation key.

11. The portable terminal as claimed in claim 9, wherein the first and second keypads are combined so as to construct a keypad of a QWERTY-type arrangement.

12. The portable terminal as claimed in claim 1, wherein the single elastic member comprises a spring housing receiving a pair of coils and free ends extending from the coils to an outside of the spring housing, respectively, the free ends being supported on the first guide member and the second housing, respectively.

13. The portable terminal as claimed in claim 12, wherein the free ends are rotatably coupled to the first guide member and the second housing, respectively.

14. A portable terminal comprising:
a first housing;
a first guide member coupled to the first housing;
a slide member, capable of sliding in a first direction, coupled to the first guide member;
a second guide member coupled to the slide member;
a second housing coupled to the second guide member; and
a single elastic member having two supported ends, one of which is supported on the first guide member fixed to the first housing and the other end is supported on the second housing so as to provide elastic force in such a direction that the one end of the elastic member moves away from the other end of the elastic member,
wherein the second housing is capable of sliding in the first direction with the slide member while the second housing is provided with elastic force by the single elastic member and the second housing is capable of sliding in a second direction perpendicular to the first direction relative to the second guide member while the second housing is provided with elastic force by the single elastic member.

15. The portable terminal as claimed in claim 14,
wherein the second housing, when overlapping the first housing, is capable of sliding in the first direction together with the slide member and the second guide member or in the second direction relative to the second guide member while the second housing is provided with elastic force by the single elastic member.

16. The portable terminal as claimed in claim 15, wherein the first direction is perpendicular to the second direction.

17. The portable terminal as claimed in claim 16, further comprising:
first guide ribs formed on first portions of lateral ends of the first guide member; and
second guide ribs formed on first portions of lateral ends of the slide member, wherein
the first guide ribs are coupled so as to surround second portions of the lateral ends of the slide member, and the second guide ribs are coupled so as to surround second portions of the lateral ends of the first guide member so that sliding movement of the slide member is supported.

18. The portable terminal as claimed in claim 17, further comprising a first guide slit formed on the second housing, wherein, when the second housing covers the first housing, the first and second guide ribs interfere with each other and, when the second housing moves in the first direction and exposes a portion of the first housing, portions of the second guide ribs engage with the first guide slit so as to limit a range of movement of the second housing in the first direction.

19. The portable terminal as claimed in claim 18, wherein, when the second housing slides in the second direction, an end of the slide member moves inside the first guide slit.

20. The portable terminal as claimed in claim 15, wherein the single elastic member comprises:

a pair of coils; and a spring housing for receiving the pair of coils, wherein the one end and the other end respectively extend from each coil of the pair of coils to an outside of the spring housing.

* * * * *